United States Patent
Suzuki

(10) Patent No.: US 8,564,645 B2
(45) Date of Patent: Oct. 22, 2013

(54) SIGNAL PROCESSING DEVICE, IMAGE DISPLAY DEVICE, SIGNAL PROCESSING METHOD, AND COMPUTER PROGRAM

(75) Inventor: Kazuyoshi Suzuki, Tokyo (JP)

(73) Assignee: Sony Corporation (JP)

( * ) Notice: Subject to any disclaimer, the term of this patent is extended or adjusted under 35 U.S.C. 154(b) by 568 days.

(21) Appl. No.: 12/657,114

(22) Filed: Jan. 14, 2010

(65) Prior Publication Data

US 2010/0182409 A1   Jul. 22, 2010

(30) Foreign Application Priority Data

Jan. 21, 2009 (JP) ................. P2009-011286

(51) Int. Cl.
*H04N 13/04* (2006.01)

(52) U.S. Cl.
USPC ....... 348/51; 348/E13.075; 359/380; 359/462

(58) Field of Classification Search
USPC .................. 348/51, E13.075; 382/154
See application file for complete search history.

(56) References Cited

U.S. PATENT DOCUMENTS

| | | | |
|---|---|---|---|
| 7,605,776 B2 | 10/2009 | Satoh et al. | |
| 2005/0286125 A1* | 12/2005 | Sundstrom et al. | 359/462 |
| 2006/0181767 A1* | 8/2006 | Hanzawa | 359/380 |
| 2008/0136900 A1* | 6/2008 | Grasnick | 348/51 |

FOREIGN PATENT DOCUMENTS

| | | | |
|---|---|---|---|
| JP | 07296185 A | 11/1995 | |
| JP | 09121370 A | 5/1997 | |
| JP | 2004-334833 A | 11/2004 | |
| JP | 2007053496 A | 3/2007 | |

OTHER PUBLICATIONS

Office Action from Japanese Application No. 2009-011286, dated Jan. 25, 2011.

* cited by examiner

*Primary Examiner* — Kyung H Shin
(74) *Attorney, Agent, or Firm* — Lerner, David, Littenberg, Krumholz & Mentlik, LLP

(57) ABSTRACT

There is provided a signal processing device including an image analysis portion that analyzes content of an input image, a distance information acquisition portion that acquires distance information between a viewer who views a screen on which the input image is displayed and the screen, and a stereoscopic image generation portion that generates a stereoscopic image from the original input image, using an analysis result of the input image analyzed by the image analysis portion, the distance information acquired by the distance information acquisition portion, and information about a specification of the screen in a horizontal direction.

7 Claims, 7 Drawing Sheets

SIGNAL PROCESSING DEVICE, IMAGE DISPLAY DEVICE, SIGNAL PROCESSING METHOD, AND COMPUTER PROGRAM

CROSS-REFERENCE TO RELATED APPLICATION

The present application claims priority from Japanese Patent Application No. JP 2009-011286 filed in the Japanese Patent Office on Jan. 21, 2009, the entire content of which is incorporated herein by reference.

BACKGROUND OF THE INVENTION

1. Field of the Invention

The present invention relates to a signal processing device, an image display device, a signal processing method and a computer program. More specifically, the present invention relates to a signal processing device, an image display device, a signal processing method and a computer program that cause a viewer to perceive a stereoscopic image.

2. Description of the Related Art

In related art, image processing devices are known that can obtain a stereoscopic image (a three-dimensional image) by displaying two sheets of images that utilize parallax between left and right eyes such that the two sheets of images can be observed by the left and right eyes respectively. Further, various types of display methods have been proposed that cause a viewer who views an image displayed by this type of image processing device to perceive the image as a stereoscopic image.

However, generally, depending on various conditions such as the size of a display device (for example, a display that displays an image) and a distance between the display device and the viewer, conditions in which a person can naturally view the image are different. Therefore, the viewer may perceive the size of an object in the image differently from the actual size of the object, and may feel a sense of discrepancy when viewing a stereoscopic image of the object. Moreover, depending on a relationship between the displayed image and the display that displays the image, stereoscopic image viewing itself may become difficult.

To address the problems described above, various technologies have been proposed. For example, Japanese Patent Application Publication No. JP-A-2004-334833 is an example of the technologies that attempt to solve the problems described above. The technology described in Japanese Patent Application Publication No. JP-A-2004-334833 adds information about an attribute of a display device to content to be displayed by the display device, thereby reducing a sense of discrepancy when viewing a stereoscopic image.

SUMMARY OF THE INVENTION

However, in the related art, depending on the relationship between the display that displays an image and the image actually displayed on the display, the viewer may still perceive the size of an object in the image differently from the actual size of the object, and the viewer may feel a sense of discrepancy when viewing a stereoscopic image of the object.

In addition, when a two-dimensional image is displayed, an angle of convergence of the two eyes of the viewer meets on a panel section of the display. Accordingly, when the two-dimensional image is displayed, the viewer perceives the distance to the panel of the display, and the viewer cannot sense depth that extends beyond the panel. As a result, the viewer cannot sense depth such as when looking at distant scenery from a window.

In light of the foregoing, it is desirable to provide a novel and improved signal processing device, image display device, signal processing method and computer program that make it possible to perceive an object in its actual size and thus make it possible to view more natural video with depth perception that is close to perception by the human senses.

According to an embodiment of the present invention, there is provided a signal processing device including an image analysis portion that analyzes content of an input image, a distance information acquisition portion that acquires distance information between a viewer who views a screen on which the input image is displayed and the screen, and a stereoscopic image generation portion that generates a stereoscopic image from the original input image, using an analysis result of the input image analyzed by the image analysis portion, the distance information acquired by the distance information acquisition portion, and information about a specification of the screen in a horizontal direction.

With the above-described structure, the image analysis portion analyzes content of an input image input to the signal processing device, and the distance information acquisition portion acquires distance information between a viewer who views a screen on which the input image is displayed and the screen. The stereoscopic image generation portion generates a stereoscopic image from the original input image, using an analysis result of the input image analyzed by the image analysis portion, the distance information between the viewer and the screen that is acquired by the distance information acquisition portion, and information about the specification of the screen in the horizontal direction. As a result, because the stereoscopic image is generated by using the analysis result of the input image, the distance information between the viewer and the screen, and the information about the specification of the screen in the horizontal direction, it is possible to perceive an object in its actual size. Thus, it is possible to cause the viewer to perceive more natural video with depth perception that is close to perception by the human senses.

The image analysis portion may include a detection portion that detects a size of an object included in the input image, and a distance calculation portion that calculates, from the size detected by the detection portion, a distance between a position of the object in a virtual space and the viewer, and the stereoscopic image generation portion may generate a stereoscopic image from the original input image, using the distance between the position of the object in the virtual space and the viewer that is calculated by the distance calculation portion, and the distance information acquired by the distance information acquisition portion, and the information about the specification of the screen in the horizontal direction.

When a face is included in the input image, the image analysis portion may detect a size of the face, and the stereoscopic image generation portion may generate a stereoscopic image from the original input image, using the size of the face detected by the image analysis portion, and the distance information acquired by the distance information acquisition portion.

The signal processing device may further include a convergence angle calculation portion that calculates, from the size of the object detected by the image analysis portion, an angle of convergence of lines of sight when the viewer views the object.

The signal processing device may further include a displacement width determination portion that determines, based on the angle of convergence calculated by the convergence angle calculation portion, a displacement width of the original input image when the stereoscopic image generation portion generates the stereoscopic image.

When the image analysis portion analyzes that the input image is a landscape at an infinite distance, the stereoscopic image generation portion may generate a stereoscopic image from the original input image, by displacing the original input image by a width corresponding to an interval between two eyes of the viewer.

When the image analysis portion analyzes that the input image is a still image, the image analysis portion may acquire photographing information of the still image, and the stereoscopic image generation portion may generate a stereoscopic image from the original input image, using the photographing information acquired by the image analysis portion, and the distance information acquired by the distance information acquisition portion.

The stereoscopic image generation portion may generate a stereoscopic image from the original input image, by cutting out an image for a right eye and an image for a left eye from a part of the input image.

According to another embodiment of the present invention, there is provided an image display device including an image display portion that displays an image, an image analysis portion that analyzes content of an input image, a distance measurement portion that measures a distance between a viewer who views the image displayed on the image display portion and an image display surface of the image display portion, and a stereoscopic image generation portion that generates a stereoscopic image to be displayed on the image display portion from the original input image, using an analysis result of the input image analyzed by the image analysis portion, information of the distance measured by the distance measurement portion, and information about a specification of the image display surface in a horizontal direction.

According to another embodiment of the present invention, there is provided a signal processing method, including the steps of analyzing content of an input image, acquiring distance information between a viewer who views a screen on which the input image is displayed and the screen, and generating a stereoscopic image from the original input image, using an analysis result of the input image in the image analyzing step, the distance information acquired in the distance information acquiring step, and information about a specification of the screen in a horizontal direction.

According to another embodiment of the present invention, there is provided an image display method, including the steps of analyzing content of an input image, measuring a distance between a viewer who views an image displayed on an image display portion and an image display surface of the image display portion, generating a stereoscopic image from the original input image, using an analysis result of the input image in the image analyzing step, information of the distance measured in the distance measuring step, and information about a specification of the image display surface in a horizontal direction, and displaying the stereoscopic image on the image display portion.

According to another embodiment of the present invention, there is provided a computer program that includes instructions that command a computer to execute the steps of analyzing content of an input image, acquiring distance information between a viewer who views a screen on which the input image is displayed and the screen, and generating a stereoscopic image from the original input image, using an analysis result of the input image in the image analyzing step, the distance information acquired in the distance information acquiring step, and information about a specification of the screen in a horizontal direction.

According to another embodiment of the present invention, there is provided a computer program that includes instructions that command a computer to execute the steps of analyzing content of an input image, measuring a distance between a viewer who views an image displayed on an image display portion and an image display surface of the image display portion, generating a stereoscopic image from the original input image, using an analysis result of the input image in the image analyzing step, information of the distance measured in the distance measuring step, and information about a specification of the image display surface in a horizontal direction, and displaying the stereoscopic image on the image display portion.

As described above, according to the present invention, it is possible to provide a new and improved image display device, signal processing device, signal processing method and computer program that make it possible to perceive an object in its actual size and thus make it possible to view more natural video with depth perception that is close to perception by the human senses.

DETAILED DESCRIPTION OF THE EMBODIMENT(S)

Figure 1:
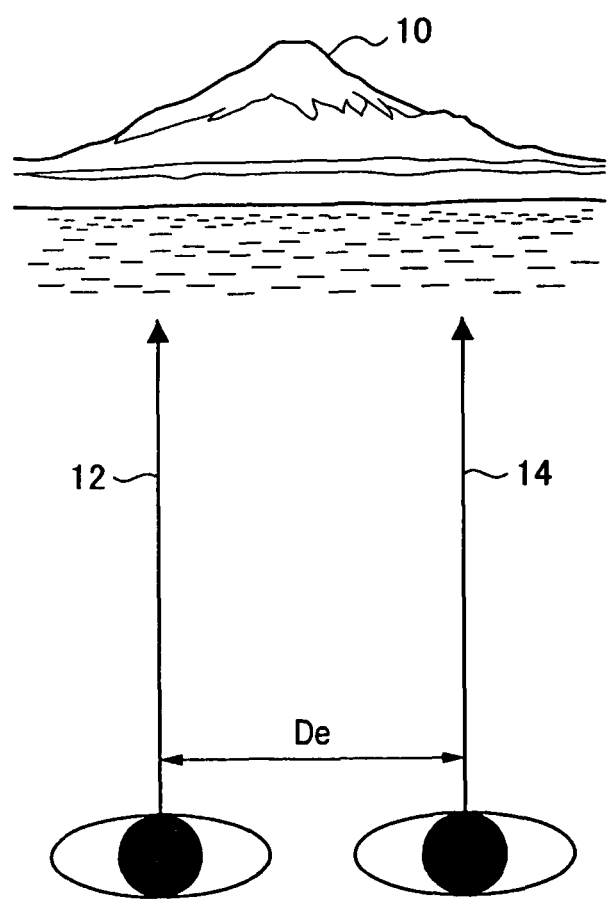
FIG. 1 is an explanatory diagram showing a case in which an actual landscape at an almost infinite distance is seen by human eyes.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Hereinafter, an exemplary embodiment of the present invention will be described in detail in the following order.

Figure 2:
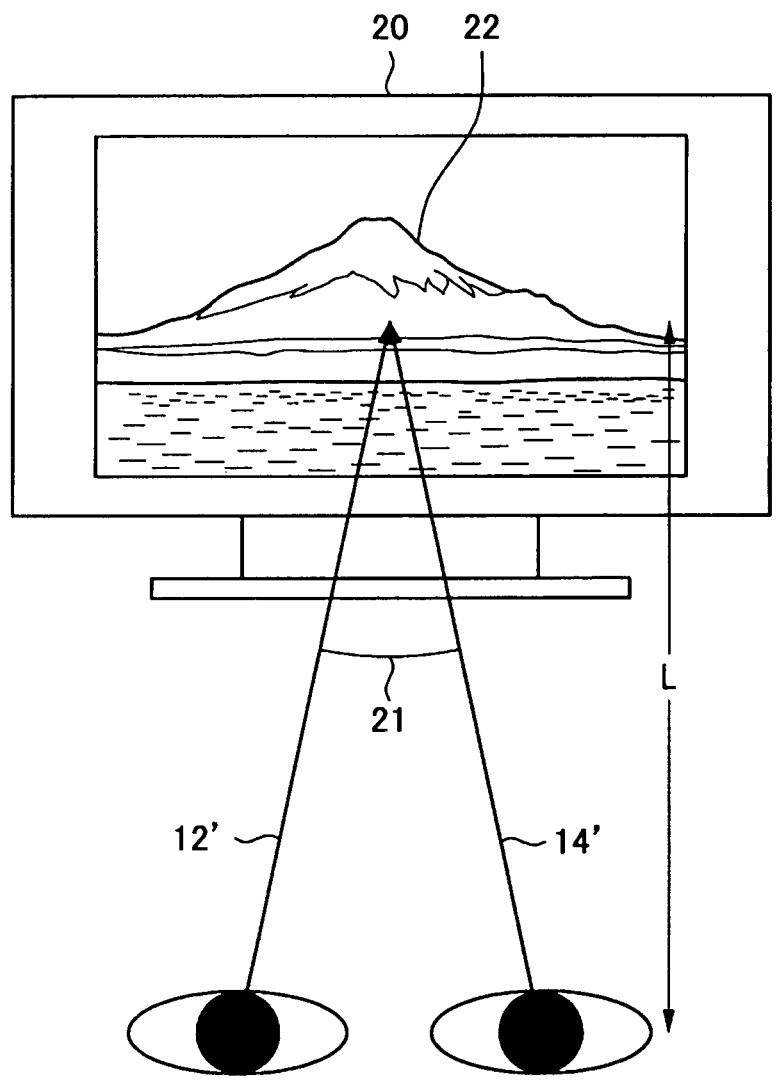
FIG. 2 is an explanatory diagram showing a case in which an image displayed on a display is seen by human eyes.

1. General three-dimensional image display method according to related art
2. Embodiment of the present invention
2-1. Structure of a signal processing device and an image display device
2-2. Signal processing method for generating a three-dimensional image
2-3. Modified example
1. General Three-Dimensional Image Display Method According to Related Art First, before describing the exemplary embodiment of the present invention in detail, three-dimensional viewing and an angle of convergence will be described. Further, a general three-dimensional image display method according to related art will be described. Hereinafter, a case in which an actual landscape at an almost infinite distance is seen and a case in which the landscape is seen on a display will be compared and explained as an example. FIG. 1 is an explanatory diagram showing a case in which an actual landscape at an almost infinite distance is seen by human eyes. FIG. 2 is an explanatory diagram showing a case in which an image displayed on a display is seen by human eyes.

As shown in FIG. 1, usually when a distant landscape is seen by human eyes, a direction 12 of the line of sight of the left eye and a direction 14 of the line of sight of the right eye are parallel to each other, and an interval between the lines of sight corresponds to an interval De between the two eyes. This is because an object 10 (a mountain in the example shown in FIG. 1) in the distant landscape is located at an infinite distance. Therefore, the angle (angle of convergence) between the lines, of sight of the two eyes is zero degrees, and a person senses a distance with respect to the object 10, due to movement of the muscles that move the eyes and the like.

On the other hand, as shown in FIG. 2, when an object 22 displayed on a display 20 is seen by human eyes, a direction 12' of the line of sight of the left eye and a direction 14' of the line of sight of the right eye are not parallel to each other, and an angle of convergence 21 is generated between the lines of sight of the two eyes. As a result, the object 22 seen by the two eyes is not recognized as an object at an infinite distance, but is recognized as an object on the display 20 that is separated from the two eyes only by a distance L. Therefore, when the object displayed on the display 20 is seen by human eyes as shown in FIG. 2, unlike the case in which the distant landscape is actually seen as shown in FIG. 1, a natural size of the object is not perceived.

Figure 3:
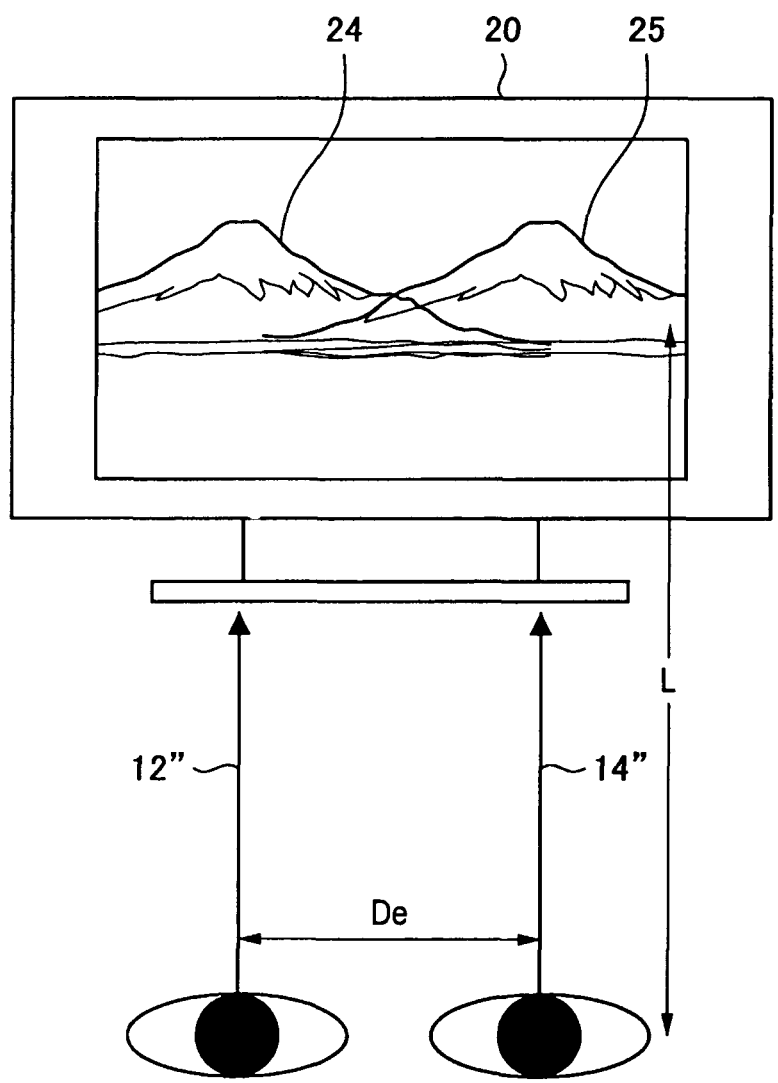
FIG. 3 is an explanatory diagram showing a case in which an image displayed on a display of a known display device that displays a three-dimensional image is seen by human eyes.

To address this, if an image that does not generate an angle of convergence when the image is seen by human eyes is displayed on a display, it is possible to obtain a three-dimensional image. FIG. 3 is an explanatory diagram showing a case in which an image displayed on a display of a known display device that displays a three-dimensional image is seen by human eyes. FIG. 3 shows a case in which a three dimensional image is obtained such that an image to be viewed three-dimensionally is displaced in a horizontal direction, and is displayed as an image 24 for the left eye and an image 25 for the right eye.

More specifically, FIG. 3 shows a case in which the display 20 displays the image 24 for the left eye and the image 25 for the right eye, which are obtained by displacing an image to be viewed as a three-dimensional image by the viewer, for each line or in a time sharing manner, by changing the direction of polarization. If the viewer looks at the image displayed on the display 20 through a pair of glasses or the like, the viewer can look at the image 24 for the left eye using only the left eye and can look at the image 25 for the right eye using only the right eye. Thus, the viewer can view a three-dimensional image.

The image 24 for the left eye and the image 25 for the right eye are displayed on the display 20 such that they are separated from each other in the horizontal direction by a distance equal to the distance De between the right eye and the left eye of the viewer. As the image 24 for the left eye and the image 25 for the right eye are displayed on the display 20 in this manner, a line of sight 12" of the left eye of the viewer and a line of sight 14" of the right eye become parallel to each other. Therefore, the angle of convergence is not generated, and the image displayed on the display 20 can be perceived as a three dimensional image, in the same manner as in the case in which the landscape located at an infinite distance is seen as shown in FIG. 1.

In order to cause the viewer to perceive, as a three dimensional image, the image displayed on an image display device that can display three-dimensional images, information of the distance De between the right eye and the left eye of the viewer is important. However a distance Dd of displacement in the horizontal direction corresponding to the distance De varies in accordance with specifications of the display in the horizontal direction, such as the width of the display and the number of pixels in the horizontal direction, or in accordance with the displayed image. More specifically, the smaller the display width of the display is or the larger the number of the pixels in the horizontal direction is, the relatively larger the amount of displacement is. Conversely, the larger the display width of the display is or the smaller the number of the pixels in the horizontal direction is, the relatively smaller the amount of displacement is.

However, with the known image display device that can display three-dimensional images, the distance Dd is a fixed value regardless of the width of the display and the number of pixels. As a result, there may be a difference in stereoscopic effect between when three-dimensional content is viewed on a large display such as a screen and a projector of a movie theater, and when the three-dimensional content is viewed on a monitor connected to a personal computer. More specifically, when using a monitor connected to a personal computer, a three-dimensional image that is desired to be displayed as an enormous object located far away may be displayed as a small object located in front of the monitor. Accordingly, the viewer may feel a sense of discrepancy or fatigue, and natural viewing is therefore difficult. Conversely, when three-dimensional content that is assumed to be displayed on a small monitor is viewed on a large display, it is conceivable that the angle of convergence has a negative value. In this case, there is a possibility that the viewer cannot perceive the three-dimensional content as a three-dimensional image.

2. Embodiment of the Present Invention

To address the above-described problems, according to an embodiment of the present invention that will be described below, information about a display that displays a three-dimensional image is used when an image for the right eye and an image for the left eye are generated, thereby causing the viewer to perceive a natural three-dimensional image. Further, when an image at a finite distance is displayed as a three-dimensional image, distance information from the display to the viewer is acquired, and the acquired distance information is used to generate the image for the right eye and the image for the left eye, thereby causing the viewer to perceive a natural three-dimensional image.

2-1. Structure of a Signal Processing Device and an Image Display Device

Figure 4:
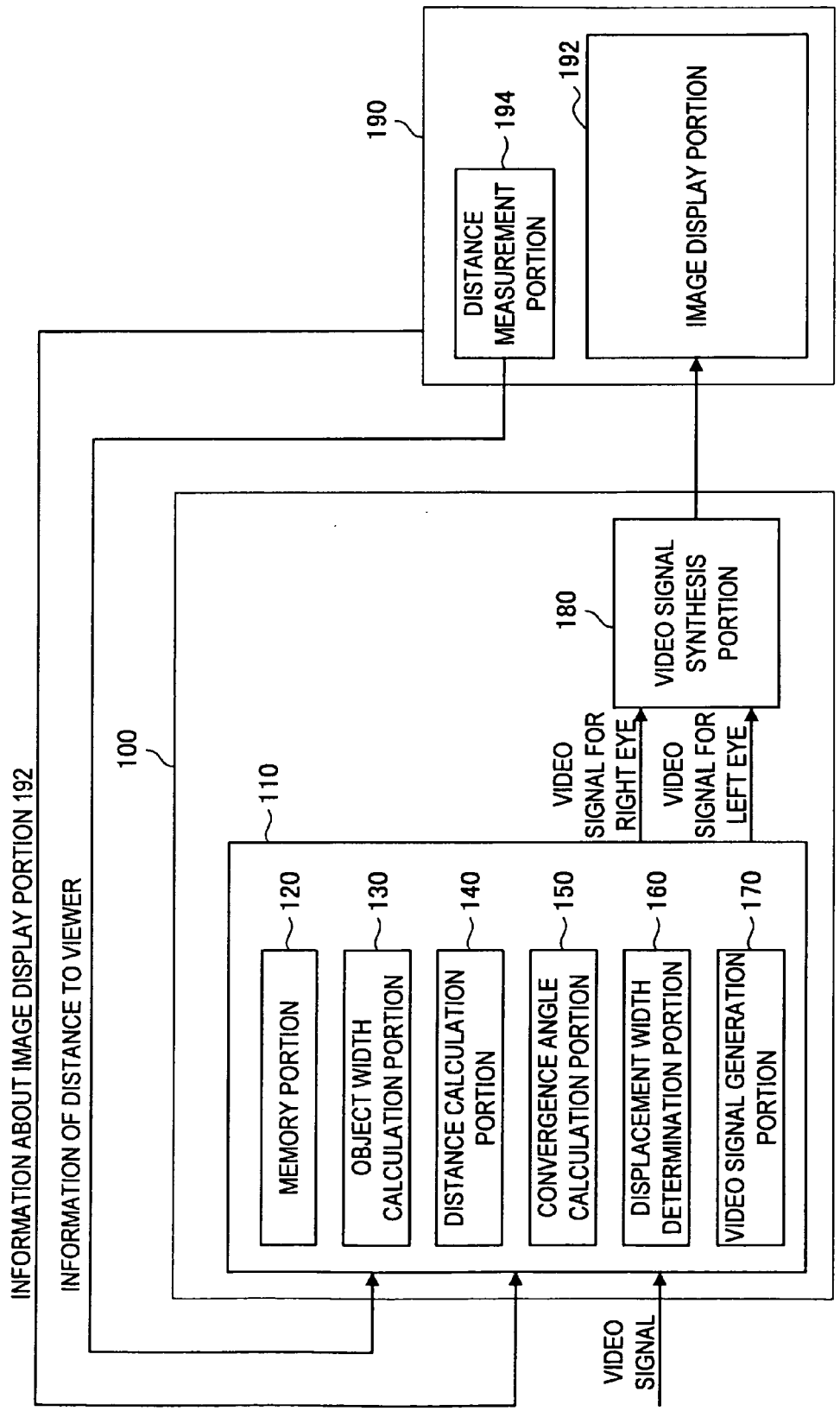
FIG. 4 is an explanatory diagram illustrating the structure of a signal processing device 100 and an image display device 190 according to an embodiment of the present invention.

First, the structure of a signal processing device and an image display device that displays images generated by the signal processing device according to the embodiment of the present invention will be described. FIG. 4 is an explanatory diagram illustrating the structure of a signal processing device 100 and an image display device 190 according to the embodiment of the present invention. Hereinafter, the structure of the signal processing device 100 and the image display device 190 according to the embodiment of the present invention will be described with reference to FIG. 4.

As shown in FIG. 4, the signal processing device 100 according to the embodiment of the present invention includes a video signal computation portion 110 and a video signal synthesis portion 180. The image display device 190 includes an image display portion 192 and a distance measurement portion 194.

The signal processing device 100 receives a video signal that is externally input, and generates, from the received video signal, a video signal to be displayed on the image display device 190 as a three dimensional image. The video signal input to the signal processing device 100 may be a signal that is produced in advance to cause the viewer to perceive it as a three-dimensional image, or may be a signal that is produced to cause the viewer to perceive it as a normal two-dimensional image. The video signal computation portion 110 executes computation processing to generate a video signal to be displayed on the image display device 190 as a three-dimensional image. The video signal computation portion 110 includes a memory portion 120, an object width calculation portion 130, a distance calculation portion 140, a convergence angle calculation portion 150, a displacement width determination portion 160 and a video signal generation portion 170.

The memory portion 120 temporarily stores information or data that is used to generate a video signal in the video signal computation portion 110. A dynamic random access memory (DRAM), a ferroelectric random access memory (FeRAM), another random access memory (RAM), a flash memory or the like can be used as the memory portion 120. The information or data temporarily stored in the memory portion 120 may be, for example, a video signal that is externally input to the signal processing device 100 and acquired by the video signal computation portion 110, information about specifications of the image display portion 192, such as the width of the image display portion 192 and the number of pixels in the horizontal direction, or distance information between the image display portion 192 and the viewer.

When an object located at a finite distance included in the video signal that is externally input to the signal processing device 100 is displayed on the image display portion 192, the object width calculation portion 130 calculates the width of the object. Examples of the object include the face and body of a person, an animal, a train, an automobile, and any other objects. The width of the object, can be calculated from the information of the width of the image display portion 192 that is stored in the memory portion 120.

When the object width calculation portion 130 calculates the width of the face of a person, it can calculate the width of the face of the person by extracting feature points such as eyes, nose, mouth etc. from the video signal and recognizing the region of the face. Therefore, the object width calculation portion 130 may be provided with a function to extract feature points such as eyes, nose, mouth etc. included in the face of a person. Further, when the object width calculation portion 130 calculates the width of an object located at a finite distance, such as the body of a person, an animal, a train or an automobile, the object width calculation portion 130 may recognize the outline of the object and calculate the width of the object based on the recognized outline. Note that known techniques can be used as a technique for extracting the features of the face of a person and as a technique for obtaining the outline of the object. A detailed explanation of these techniques is therefore omitted here.

The distance calculation portion 140 uses the information of the width of the object calculated by the object width calculation portion 130 and the distance information between the image display portion 192 and the viewer who is viewing the image displayed on the image display portion 192 to estimate and calculate a distance between the viewer and the object. A method for calculating the distance between the viewer and the object in the distance calculation portion 140 will be described later in detail.

The convergence angle calculation portion 150 uses the distance information between the viewer who is viewing an image displayed on the image display portion 192 and an object displayed on the image display portion 192 calculated by the distance calculation portion 140 to calculate the angle of convergence when the viewer looks at the object. A method for calculating the angle of convergence in the convergence angle calculation portion 150 will be described later in detail.

The displacement width determination portion 160 determines, based on the convergence angle information calculated by the convergence angle calculation portion 150, a displacement width in the horizontal direction of a video signal input to the video signal computation portion 110. The displacement width in the horizontal direction corresponds to an interval between an image for the right eye and an image for the left eye to be displayed on the image display device 190. If the video signal generation portion 170 generates a video signal for the right eye and a video signal for the left eye based on the information of the displacement width determined by the displacement width determination portion 160, it is possible to display a three-dimensional image on the image display device 190.

Based on the information of the displacement width of the video signal in the horizontal direction that is determined by the displacement width determination portion 160, the video signal generation portion 170 generates a video signal for the right eye and a video signal for the left eye from the video signal input to the video signal computation portion 110. The video signal for the right eye and the video signal for the left eye generated by the video signal generation portion 170 are transmitted to the video signal synthesis portion 180.

The video signal synthesis portion 180 uses the video signal for the right eye and the video signal for the left eye generated by the video signal generation portion 170 to generate a video signal to be displayed on the image display device 190 as a three-dimensional image. When the video signal synthesis portion 180 synthesizes the video signal for the right eye and the video signal for the left eye and generates a video signal, the generated video signal is transmitted to the image display device 190.

The image display device 190 inputs the video signal generated by the signal processing device 100, and displays an image based on the input video signal. The image display portion 192 displays an image based on the video signal input to the image display device 190. When the image display device 190 is a television receiver, the image display portion 192 may be, for example, a cathode ray tube (CRT), a liquid crystal display panel, a plasma display panel, a field emission display panel, or an organic EL panel. Further, when the image display device 190 is a projector, the image display portion 192 may be a screen onto which video is projected. Moreover, the image display device 190 is not limited to a television receiver and a projector, and it can be applied to all devices having a display device, such as a personal computer, and a mobile phone etc.

Note that the image display device 190 can display not only a three-dimensional image but also a normal two-dimensional image. The display of a two-dimensional image and the display of a three-dimensional image may be switched based on user input to the signal processing device 100, or may be automatically switched in accordance with the video signal output from the signal processing device 100.

The distance measurement portion 194 measures a distance between the image display portion 192 and the viewer who views the image displayed on the image display portion 192. The distance measurement portion 194 may measure the distance between the image display portion 192 and the viewer, for example, by using a camera provided in the vicinity of the image display portion 192 to photograph the viewer, or by using an ultrasonic wave sensor provided in the vicinity of the image display portion 192. Information of the distance between the image display portion 192 and the viewer that is measured by the distance measurement portion 194 is output to the signal processing device 100. Based on the distance between the image display portion 192 and the viewer that is measured by the distance measurement portion 194, the signal processing device 100 generates a video signal for the right eye and a video signal for the left eye.

Note that there are various methods as a three-dimensional image display method to cause the viewer to perceive a stereoscopic image. In the description hereinafter, as an example of such a display method, a case will be described in which the image display portion 192 is a liquid crystal display panel and causes the viewer to perceive a three-dimensional image by changing the direction of polarization of odd lines and even lines of the image display portion 192

In this case, for example, an image based on the video signal for the left eye is displayed on odd lines of the image display portion 192, and an image based on the video signal for the right eye is displayed on even lines. Accordingly, in the signal processing device 100, the video signal synthesis portion 180 synthesizes the video signal for the left eye and the video signal for the right eye such that the video signal for the left eye is positioned on an odd line and the video signal for the right eye is positioned on an even line. The viewer wears a pair of glasses with different directions of polarization for the right eye and the left eye, and the viewer looks at the image displayed on the image display portion 192 through the pair of glasses. By looking at the image in this manner, the viewer can look at the image based on the video signal for the right eye using only the right eye, and can look at the image based on the video signal for the left eye using only the left eye, respectively. As a technique for causing the viewer to perceive a three-dimensional image by changing the direction of polarization of the odd lines and the even lines of the image display portion 192, the technology disclosed in Japanese Patent Application Publication No. 2004-334833, for example, can be used.

Note that, in the present invention, it is needless to mention that the display method of a three-dimensional image is not limited to the above-described examples. An image may be displayed on the image display device 190 using a method other than the above-described methods. As a method other than the above-described methods, there is a method for switching the display of the image for the right eye and the display of the image for the left eye in a time sharing manner, by driving a frame at a double speed or more, for example.

In addition, in FIG. 4, the signal processing device 100 generates the video signal for displaying a three-dimensional image, and the generated video signal is output to the image display device 190. However, the present invention is not limited to this example. For example, the structural elements of the signal processing device 100 may be provided inside the image display device 190, and a single unit of the image display device 190 may generate the video signal for generating a three dimensional image.

The structure of the signal processing device 100 and the image display device 190 according to the embodiment of the present invention are described above. Next, a signal processing method for generating a three dimensional image using the signal processing device 100 and the image display device 190 according to the embodiment of the present invention will be described.

2-2. Signal Processing Method for Generating a Three-Dimensional Image

First, a signal processing method for generating a three-dimensional image will be described, in a case where the video signal input to the signal processing device 100 is a video signal to display an object at an infinite distance such as a landscape.

When the video signal for displaying an object at an infinite distance such as a landscape is input, an original input image input to the signal processing device 100 is displaced by a distance between the two eyes, and an image for the right eye and an image for the left eye are generated. Then, the generated image for the right eye and image for the left eye are synthesized. As a result of generating and synthesizing the images in this manner, a three-dimensional image can be generated from the video signal to display the object at an infinite distance such as a landscape.

When FIG. 3 is used for explanation, the interval Dd between the image for the right eye and the image for the left eye can be set to be equal to the distance De between the two eyes. Therefore, if the width of the image display portion 192 is denoted by Wd, the number of pixels of the image display portion 192 in the lateral direction is denoted by Nd, and the number of pixels of the image display portion 192 in the horizontal direction that corresponds to the distance De is denoted by Ne, the interval Dd between the image for the right eye and the image for the left eye can be obtained from the following Expression 1.

$$Dd = De = \frac{Ne}{Nd} \times Wd \qquad \text{Expression 1}$$

If the above Expression 1 is rewritten such that the left-hand side is Ne, the following Expression 2 is obtained.

$$Ne = \frac{Nd}{Wd} \times De \qquad \text{Expression 2}$$

The signal processing device 100 can receive, from the image display device 190, information about the width Wd of the image display portion 192 and the number of pixels Nd of the image display portion 192 in the lateral direction. Accordingly, the number of pixels Ne to be displaced from the original image can be calculated from the above Expression 2 by the displacement width determination portion 160 of the video signal computation portion 110. Then, if a video signal for the right eye and a video signal for the left eye are generated by the video signal generation portion 170 based on the number of pixels Ne calculated by the displacement width determination portion 160, it is possible to generate a three-dimensional image from the video signal to display an object at an infinite distance.

Note that, if the original image is displaced by the distance between the two eyes in this manner and the image for the right eye and the image for the left eye are generated, a non-image part is generated on the left side of the image display portion 192 in the image for the right eye, and a non-image part is generated on the right side of the image display portion 192 in the image for the left eye. The non-image part is displayed as a black vertical band, for example. Therefore, in order not to generate the non-image part, the image for the right eye and the image for the left eye may be generated by cutting out a part of the original image.

Figure 5:
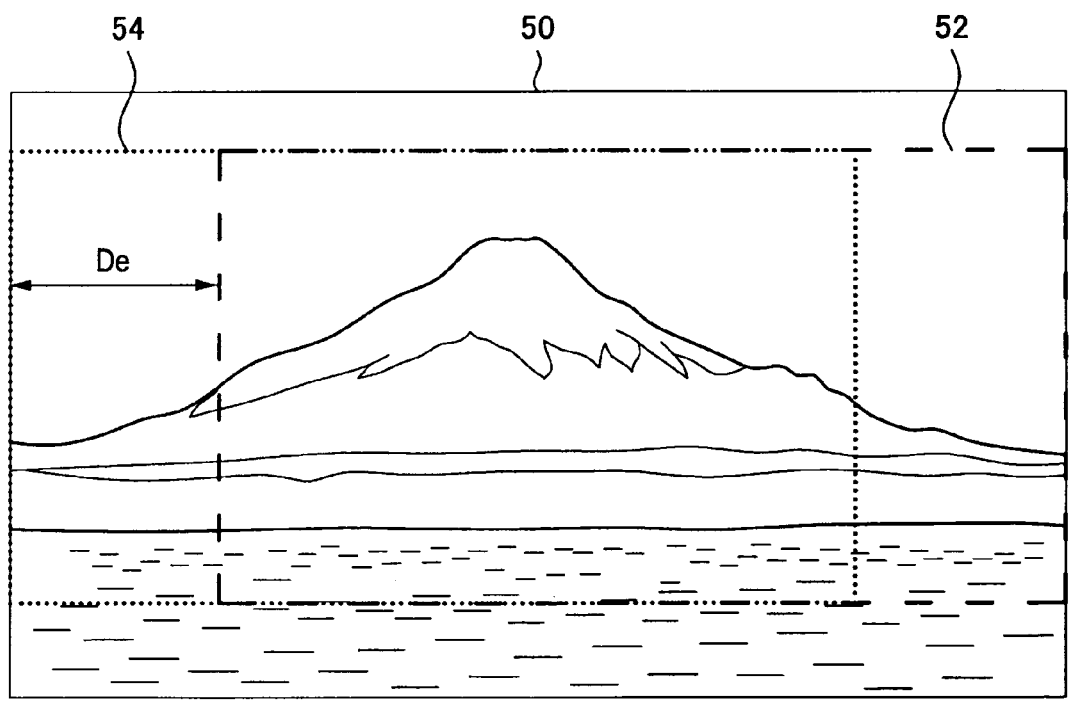
FIG. 5 is an explanatory diagram showing an example of how to cut out an image.

FIG. 5 is an explanatory diagram showing an example of how to cut out an image, in a case where a part of an original image is cut out and the image for the right eye and the image for the left eye are generated in order not to generate the non-image part. FIG. 5 shows a case in which, a cut out frame 52 of the image for the right eye and a cut out frame 54 of the image for the left eye are used to cut out an image from an original image 50.

Here, the respective cut out frames are set such that a distance Dc between the left end of the cut out frame 52 of the image for the right eye and the left end of the cut out frame 54 of the image for the left eye is equal to the distance De between the two eyes. If the width of the image display portion 192 is denoted by Wd, the number of pixels of the image display portion 192 in the lateral direction is denoted by Nd, and the number of pixels of the display portion 192 in the horizontal direction that corresponds to the distance Dc is denoted by Ne, the distance Dc can be obtained from the following Expression 3.

$$Dc(=Dd) = De = \frac{Ne}{Nd} \times Wd \qquad \text{Expression 3}$$

If the above Expression 3 is rewritten such that the left-hand side is Ne, the following Expression 4 is obtained.

$$Ne = \frac{Nd}{Wd} \times De \qquad \text{Expression 4}$$

This Expression 4 is the same as the above Expression 2. The signal processing device 100 can receive, from the image display device 190, information about the width Wd of the image display portion 192 and the number of pixels Nd of the image display portion 192 in the lateral direction. Accordingly, the number of pixels Ne of the image display portion 192 corresponding to the distance Dc can be calculated from the above Expression 2 by the displacement width determination portion 160 of the video signal computation portion 110.

If the video signal for the right eye and the video signal for the left eye are generated in this manner, when the viewer looks at the object at an infinite distance displayed on the image display device 190, there is no angle of convergence. Thus, it is possible to cause the viewer to perceive the object not at the position of the image display portion 192, but at a distant position.

Hereinabove, the signal processing method for generating a three-dimensional image is described, for the case where the video signal input to the signal processing device 100 is a signal for displaying an object at an infinite distance, such as a landscape. Next, a signal processing method for generating a three-dimensional image will be described below, for a case where the video signal input to the signal processing device 100 is a signal for displaying an object at a finite distance, such as a person. Hereinafter, a case will be described in which a three-dimensional image is generated from video content in which a face of a person is photographed as an object at a finite distance.

Figure 6:
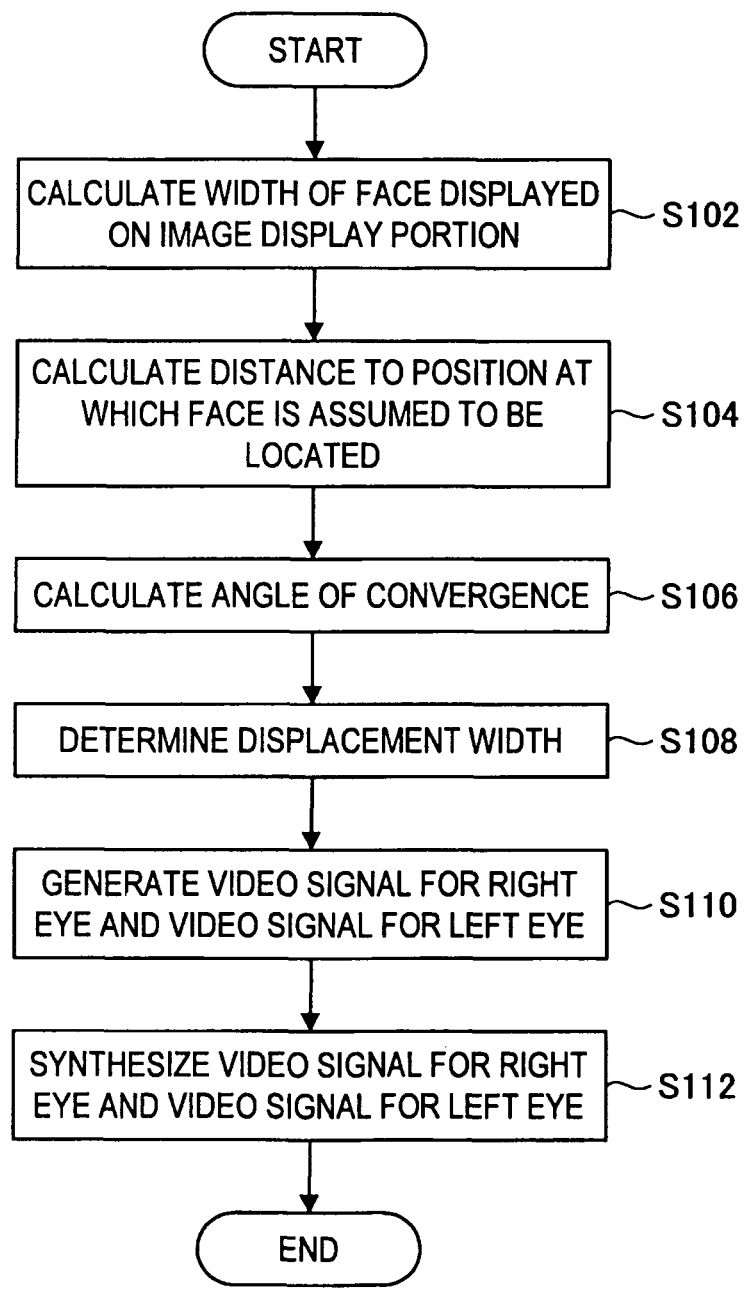
FIG. 6 is a flowchart illustrating a signal processing method for generating a three-dimensional image.
Figure 7:
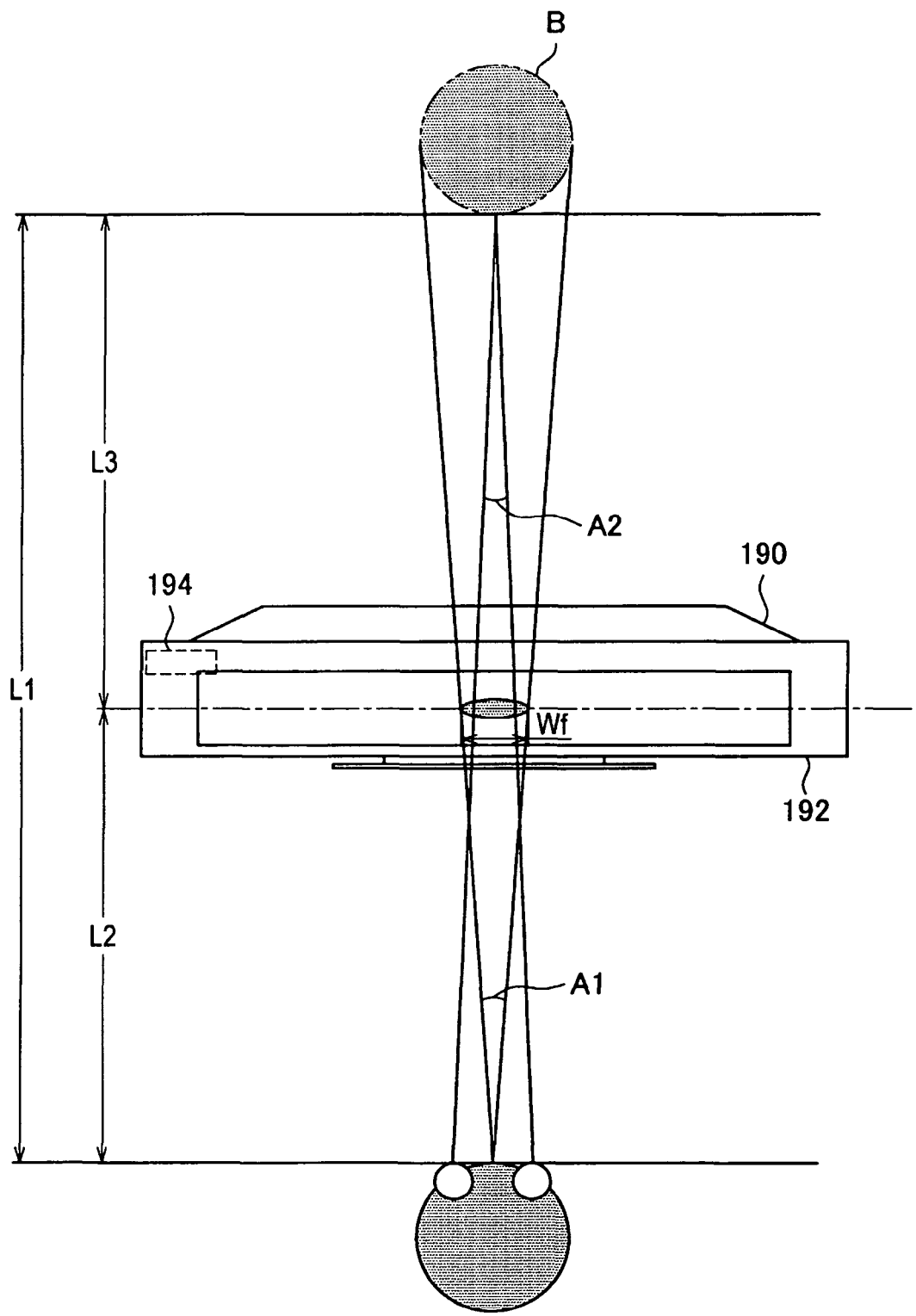
FIG. 7 is an explanatory diagram showing a positional relationship between an object and a viewer.

FIG. 6 is a flowchart illustrating a signal processing method for generating a three-dimensional image. FIG. 7 is an explanatory diagram showing a positional relationship between an object and a viewer, in a case where a face of a person is displayed as an object on the image display device 190. The signal processing method for generating a three-dimensional image will be described below with reference to FIG. 6 and FIG. 7.

First, based on information about the width of the image display portion 192 and the number of pixels in the horizontal direction, a width Wf of the face displayed on the image display portion 192 is calculated by the object width calculation portion 130 (step S102). For example, let us assume a case in which the width of the image display portion 192 is 100 cm, and the number of pixels in the horizontal direction is 1,920. In this case, if the face section corresponds to 120 pixels, the width Wf of the face displayed on the image display portion 192 is 6.25 cm. As described earlier, the object width calculation portion 130 can calculate the width of the face of the person, by extracting feature points such as eyes, nose, mouth etc. from the video signal and recognizing the region of the face.

After the width Wf of the face displayed on the image display portion 192 is calculated at step S102, then, the distance calculation portion 140 calculates an angle A1 of the face displayed on the image display portion 192, using a distance L2 between the image display portion 192 and the viewer. Along with the calculation of the angle A1 of the face displayed on the image display portion 192, the distance calculation portion 140 calculates a distance L1 between the viewer and a position B at which the face displayed on the image display portion 192 is assumed to be located (step S104).

When the width Wf of the face displayed on the image display portion 192 is ascertained and information of the distance L2 between the image display portion 192 and the viewer is further ascertained, it is possible to calculate the angle A1 of the face displayed on the image display portion 192. In addition, the size of the human face is roughly determined, and whether the person of the displayed face is an adult or a child can be identified by face recognition processing in the object width calculation portion 130. As a result, the position B at which the face displayed on the image display portion 192 is assumed to be located can also be determined. If the position B is determined, it is possible to calculate a distance L3 between the image display portion 192 and the position B at which the face is assumed to be located. Accordingly, it is also possible to calculate the distance L1 (=L2+L3) between the viewer and the position B at which the face displayed on the image display portion 192 is assumed to be located.

Note that, in the present invention, the calculation method of the distance L1 between the viewer and the position B at which the face displayed on the image display portion 192 is assumed to be located is not limited to the above described example. For example, position information of the object may be provided in advance to the signal processing device 100 in a meta-data format, in synchronization with the video signal input to the signal processing device 100, or as additional data other than the video signal. Further, position information (for example, the distance L3 between the image display portion 192 and the position B at which the face is assumed to be located) may be acquired by the distance calculation portion 140 analyzing the meta-data provided to the signal processing device 100, and the distance L1 between the viewer and the position B at which the face displayed on the image display portion 192 is assumed to be located may be calculated.

Note that, when a plurality of faces are recognized from the video signal input to the signal processing device 100, the distance between the viewer and a person located closest to the viewer may be calculated as the distance L1, at the above step S104.

If the angle A1 of the face displayed on the image display portion 192 and the distance L1 between the viewer and the position B at which the face is assumed to be located are calculated at the above step S104, then an angle of convergence A2 is calculated using information of the calculated distance L1 (step S106). The angle of convergence A2 is an angle between the line of sight of the left eye and the line of sight of the right eye when the viewer looks at the object (the face) separated from the viewer by the distance L1.

If the angle of convergence A2 is obtained at the above step S106, then the displacement width determination portion 160 determines the displacement width Dc between the image for the right eye and the image for the left eye, using information of the obtained angle of convergence A2 and the distance L2 between the image display portion 192 and the viewer (step S108). Then, based on the displacement width Dc determined at step S108, the video signal generation portion 170 generates a video signal for the right eye and a video signal for the left eye (step S110). Note that the video signal for the right eye and the video signal for the left eye may be generated to be an image that is obtained by simply displacing the image displayed by the original video signal in the left-right direction, or may be generated by cutting out a part of the original image as shown in FIG. 5 so that a non-image part is not generated.

Next, the video signal synthesis portion 180 synthesizes the video signal for the right eye and the video signal for the left eye that are generated at the above step S110 (step S112). The video signal synthesized by the video signal synthesis portion 180 is input to the image display device 190, and is displayed on the image display portion 192. If the viewer looks at the image displayed on the image display portion 192, for example, through a pair of glasses with different directions of polarization for the right eye and the left eye, the viewer can perceive the image as a three-dimensional image.

Hereinabove, the signal processing method for generating a three-dimensional image is described, for the case where the video signal input to the signal processing device 100 is a signal for displaying an object at a finite distance, such as a person.

As described above, according to the embodiment of the present invention, when the image of an object at an infinite distance such as a landscape is displayed by the image display device 190, the interval between the image for the right eye and the image for the left eye is determined in accordance with the width of the image display portion 192 and the number of pixels in the horizontal direction. By determining the interval between the image for the right eye and the image for the left eye in this manner, it is possible to cause the viewer to perceive the image of the object at an infinite distance as a natural three-dimensional image with depth perception.

Further, when an object at a finite distance is displayed by the image display device 190, the distance from the viewer to the object is estimated. Then, with an appropriate angle of convergence corresponding to the estimated distance, the interval between the image for the right eye and the image for the left eye is determined. By determining the interval between the image for the right eye and the image for the left eye in this manner, it is possible to cause the viewer to perceive the image of the object at a finite distance as a natural three-dimensional image with depth perception.

2-3. Modified Example

Next, a modified example of the embodiment of the present invention will be described. In the embodiment of the present invention described above, the video signal is input to the signal processing device 100, and a video signal for the right eye and a video signal for the left eye to cause the viewer to perceive a three dimensional image are generated from the input video signal in the signal processing device 100. In this modified example, a case will be described in which the video signal for the right eye and the video signal for the left eye to cause the viewer to perceive a three dimensional image are generated from a still image, such as photo data.

Generally, in a still image such as photo data, information about a focal distance, a shutter speed and an aperture etc. that is set when photographing the still image is recorded as meta-data in association with the still image. Therefore, in order to generate, as a three-dimensional image, signals of an image for the right eye and an image for the left eye from the still image, first, the object width calculation portion 130 analyzes the still image and calculates the width of an object. Then, the distance calculation portion 140 analyzes the meta-data that is recorded in association with the still image, and estimates the distance from the viewer to the object included in the still image.

If the distance from the viewer to the object included in the still image is estimated, the convergence angle calculation portion 150 calculates the angle of convergence, and the displacement width determination portion 160 determines a displacement width of the still image based on the calculated angle of convergence. Then, the video signal generation portion 170 generates a signal for the right eye and a signal for the left eye based on the determined displacement width, and the video signal synthesis portion 180 syntheses the generated signals. Thus, it is possible to cause the viewer to perceive the still image such as photo data as a three-dimensional image.

The modified example of the embodiment of the present invention is described above. Note that operations of the signal processing device 100 according to the embodiment of the present invention and the modified example of the embodiment may be performed such that a central processing unit (CPU) and another control device sequentially read a computer program stored inside the signal processing device 100. The computer program may be stored in various types of ROM or RAM, as well as in a CD-ROM, a DVD-ROM or another recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing device comprising:
an image analysis portion that analyzes content of an input image;
a distance information acquisition portion that acquires distance information between a viewer who views a screen on which the input image is displayed and the screen; and
a stereoscopic image generation portion,
in which the image analysis portion includes (i) a detection portion that detects a size of an object included in the input image, and (ii) a distance calculation portion that calculates, from the size detected by the detection portion, a distance between a position of the object in a virtual space and the viewer, in which the position of the object in the virtual space represents a position at which the object is assumed to be located beyond the screen in a direction away from the viewer so that the position of the object in the virtual space is different from a position of the screen such that the calculated distance between the position of the object in the virtual space and the viewer is larger than the distance between the viewer and the screen, and in which the stereoscopic image generation portion generates a stereoscopic image from the original input image using (i) the distance between the position of the object in the virtual space and the viewer that is calculated by the distance calculation portion, (ii) the distance information acquired by the distance information acquisition portion, and (iii) information about the specification of the screen in the horizontal direction.

2. The signal processing device according to claim 1, wherein when a face is included in the input image, the image analysis portion detects a size of the face, and the stereoscopic image generation portion generates a stereoscopic image from the original input image, using the size of the face detected by the image analysis portion, and the distance information acquired by the distance information acquisition portion.

3. The signal processing device according to claim 1, further comprising:

a convergence angle calculation portion that calculates, from the size of the object detected by the image analysis portion, an angle of convergence of lines of sight when the viewer views the object.

4. The signal processing device according to claim 3, further comprising:

a displacement width determination portion that determines, based on the angle of convergence calculated by the convergence angle calculation portion, a displacement width of the original input image when the stereoscopic image generation portion generates the stereoscopic image.

5. The signal processing device according to claim 1, wherein when a plurality of faces is included in the input image, the object is a face in the virtual space which is closest to the viewer such that the distance calculation portion calculates the distance between a position of the closest face in the virtual space and the viewer.

6. A signal processing method, comprising the steps of:
analyzing content of an input image;
acquiring distance information between a viewer who views a screen on which the input image is displayed and the screen; and
generating a stereoscopic image,
in which the analyzing step includes (i) detecting a size of an object included in the input image, and (ii) calculating, from the detected size, a distance between a position of the object in a virtual space and the viewer, in which the position of the object in the virtual space represents a position at which the object is assumed to be located beyond the screen in a direction away from the viewer so that the position of the object in the virtual space is different from a position of the screen such that the calculated distance between the position of the object in the virtual space and the viewer is larger than the distance between the viewer and the screen, and in which the generating step generates a stereoscopic image to be displayed from the original input image using (i) information of the distance between the position of the object in the virtual space and the viewer that is calculated by the calculating step, (ii) information of the distance information acquired by the acquiring step, and (iii) information about the specification of the screen in the horizontal direction.

7. A computer-readable recording medium having stored thereon a computer program that comprises instructions that command a computer to execute the steps of;

analyzing content of an input image;
acquiring distance information between a viewer who views a screen on which the input image is displayed and the screen; and
generating a stereoscopic image,
in which the analyzing step includes (i) detecting a size of an object included in the input image, and (ii) calculating, from the detected size, a distance between a position of the object in a virtual space and the viewer, in which the position of the object in the virtual space represents a position at which the object is assumed to be located beyond the screen in a direction away from the viewer so that the position of the object in the virtual space is different from a position of the screen such that the calculated distance between the position of the object in the virtual space and the viewer is larger than the distance between the viewer and the screen, and in which the generating step generates the stereoscopic image from the original input image using (i) information of the distance between the position of the object in the virtual space and the viewer that is calculated by the calculating step, (ii) information of the distance information acquired by the acquiring step, and (iii) information about the specification of the screen in the horizontal direction.

* * * * *